US012640497B2

(12) United States Patent
Lin et al.

(10) Patent No.: US 12,640,497 B2
(45) Date of Patent: May 26, 2026

(54) ANTENNA MODULE

(71) Applicant: MEDIATEK INC., Hsinchu City (TW)

(72) Inventors: Yen-Ju Lin, Hsinchu City (TW); Wun-Jian Lin, Hsinchu City (TW); Shih-Huang Yeh, Hsinchu City (TW); Nai-Chen Liu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 239 days.

(21) Appl. No.: 18/455,037

(22) Filed: Aug. 24, 2023

(65) Prior Publication Data

US 2024/0079767 A1 Mar. 7, 2024

Related U.S. Application Data

(60) Provisional application No. 63/374,374, filed on Sep. 2, 2022.

(51) Int. Cl.

*H01Q 21/08* (2006.01)
*H01Q 1/22* (2006.01)
*H01Q 21/28* (2006.01)
*H01Q 23/00* (2006.01)

(52) U.S. Cl.

CPC ........... *H01Q 21/08* (2013.01); *H01Q 1/2283* (2013.01); *H01Q 21/28* (2013.01); *H01Q 23/00* (2013.01)

(58) Field of Classification Search

CPC ...... H01Q 1/2283; H01Q 21/08; H01Q 21/28; H01Q 23/00

See application file for complete search history.

(56) References Cited

U.S. PATENT DOCUMENTS

| | | | | |
|---|---|---|---|---|
| 2019/0305429 | A1* | 10/2019 | Ying | H01Q 5/378 |
| 2022/0368031 | A1* | 11/2022 | Gouchi | H01Q 1/2283 |
| 2023/0145095 | A1* | 5/2023 | Onaka | H04B 1/3827 455/73 |
| 2024/0047881 | A1* | 2/2024 | Sugahara | H01Q 5/42 |
| 2025/0260157 | A1* | 8/2025 | Dokai | H01Q 21/08 |

* cited by examiner

*Primary Examiner* — Daniel Munoz

(74) *Attorney, Agent, or Firm* — McClure, Qualey & Rodack, LLP

(57) ABSTRACT

An antenna module is provided. The antenna module includes a dielectric substrate, a radio frequency integrated circuit (RFIC) and a first number of first antennas. The radio frequency integrated circuit (RFIC) is disposed on the dielectric substrate, wherein the RFIC comprises a single first antenna port group and second antenna port groups to receive or transmit signals. The first number of first antennas is arranged in a first row on the dielectric substrate, wherein at least two of the first antennas are connected to the first antenna port group of the RFIC.

19 Claims, 15 Drawing Sheets

ANTENNA MODULE

CROSS REFERENCE TO RELATED APPLICATIONS

This application claims the benefit of U.S. Provisional Application No. 63/374,374, filed Sep. 2, 2022, the entirety of which is incorporated by reference herein.

BACKGROUND OF THE INVENTION

Field of the Invention

The present invention relates to an antenna module, and, in particular, to antenna arrays of an antenna module.

DESCRIPTION OF THE RELATED ART

Antennas are essential components of all modern electronic devices that require radio-frequency functionality, such as smartphones, tablet computers, and notebook computers. As communication standards evolve to provide faster data transfer rates and higher throughput, the demands placed on antennas are becoming more challenging. For example, to meet the requirements of fifth-generation (5G) mobile telecommunication at FR2 (Frequency Range 2) bands with MIMO (multi-input multi-output) of dual-polarization diversity, an antenna needs to support broader bandwidths. It also needs to be able to transmit and receive independent signals of different polarizations (e.g., two signals carrying two different data streams by horizontal polarization and vertical polarization) with high signal isolation between these different polarizations, so as to provide high cross-polarization discrimination (XPD).

Moreover, antennas need to be compact in size, since modern electronic devices need to be slim, lightweight, and portable, and these devices have limited space available for an antenna. Accordingly, antennas need to have a high bandwidth-to-volume ratio representing bandwidth per unit volume (measured in, e.g., Hz/($mm^3$)) and an enhanced effective isotropic radiated power (EIRP). In order to improve communication with high-end smartphone applications, an antenna module having enhanced performance and a small size is desirable.

BRIEF SUMMARY OF THE INVENTION

An embodiment of the present invention provides an antenna module. The antenna module includes a dielectric substrate, a radio frequency integrated circuit (RFIC) and a first number of first antennas. The radio frequency integrated circuit (RFIC) is disposed on the dielectric substrate, wherein the RFIC includes a first antenna port group and second antenna port groups to receive or transmit signals. The first number of first antennas is arranged in a first row on the dielectric substrate, wherein all of the first antennas are connected to the first antenna port group of the RFIC.

An embodiment of the present invention provides an antenna module. The antenna module includes a dielectric substrate, a radio frequency integrated circuit (RFIC) and antennas. The radio frequency integrated circuit (RFIC) is disposed on the dielectric substrate. The RFIC includes a single first antenna port group and second antenna port groups to receive or transmit signals. The antennas are arranged in a row on the dielectric substrate and opposite the RFIC. A first portion of the antennas are all connected to the first antenna port group of the RFIC by a single first conductive trace group. A second portion of the antennas are individually connected to the different second antenna port groups of the RFIC by second conductive trace groups.

In addition, an embodiment of the present invention provides an antenna module. The antenna module includes a dielectric substrate, a radio frequency integrated circuit (RFIC), a first antenna array and a second antenna array. The dielectric substrate includes a first planar portion, a second planar portion and a bent portion. The first planar portion and the second planar portion face different directions. The bent portion is connected between the first planar portion and the second planar portion. The radio frequency integrated circuit (RFIC) is disposed on the dielectric substrate, wherein the RFIC includes a single first antenna port group and second antenna port groups to receive or transmit signals. The first antenna array including first antennas is arranged in a first row on the first planar portion and connected to the first antenna port group and the second antenna port groups. The first antenna array includes a sub-array composed of at least two of the first antennas connected to the first antenna port group of the RFIC. The second antenna array including second antennas is arranged in a second row on the second planar portion.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
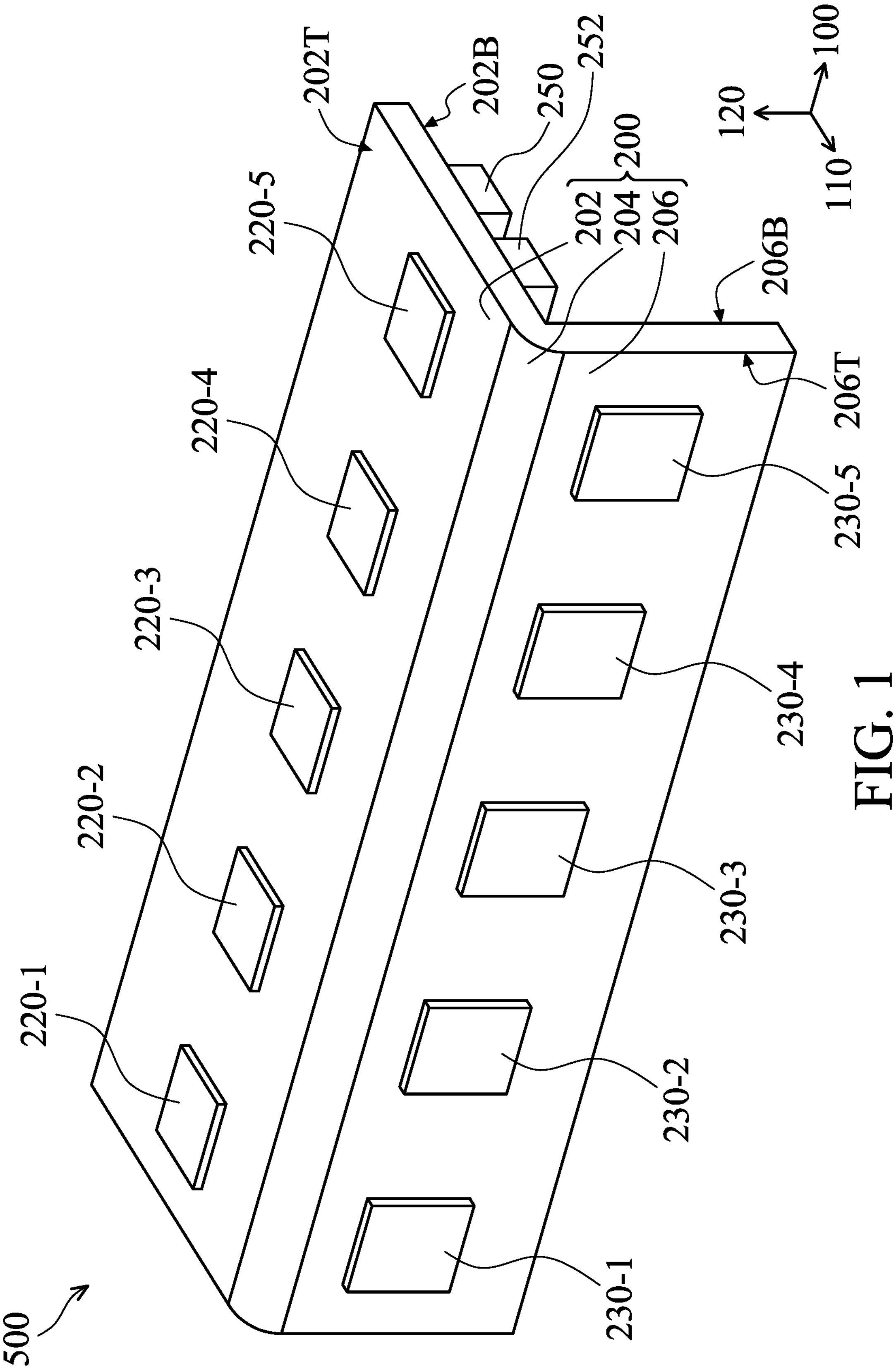
FIG. 1 is a perspective view of an antenna module in accordance with some embodiments of the disclosure.

The following description is made for the purpose of illustrating the general principles of the invention and should not be taken in a limiting sense. The scope of the invention is best determined by reference to the appended claims.

The inventive concept is described fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. Also, the drawings as illustrated are only schematic and are non-limiting. In the drawings, the size of some of the elements may be exaggerated for illustrative purposes and not drawn to scale. The dimensions and the relative dimensions do not correspond to actual dimensions in the practice of the invention The conventional L-shaped antenna module usually composed of two one-dimensional antenna arrays (i.e., an array of 1×m, wherein m is integer equal to or greater than two) arranged on the two planar portions to enhance effective isotropic radiated power (EIRP). However, the one-dimensional antenna arrays have limited configurations due to the limited number of antenna ports (32 antenna ports in total) of the radio frequency integrated circuit (RFIC). For example, the one-dimensional antenna arrays may have a combination of an 1×3 array and an 1×5 array or a combination of two 1×4 arrays. In the combination an 1×3 array and an 1×5 array, although the 1×5 antenna array may have the improved EIRP due to the increased number of the antennas and one more power amplifier (PA) in the radio frequency integrated circuits (RFICs) designated for the 1×5 antenna array, the 1×3 array may decrease the gain of the antenna array due to the lower number of antennas. In order to both improve EIRP and gain, an antenna module having a novel arrangement of the antenna arrays is desirable.

Figure 2A:
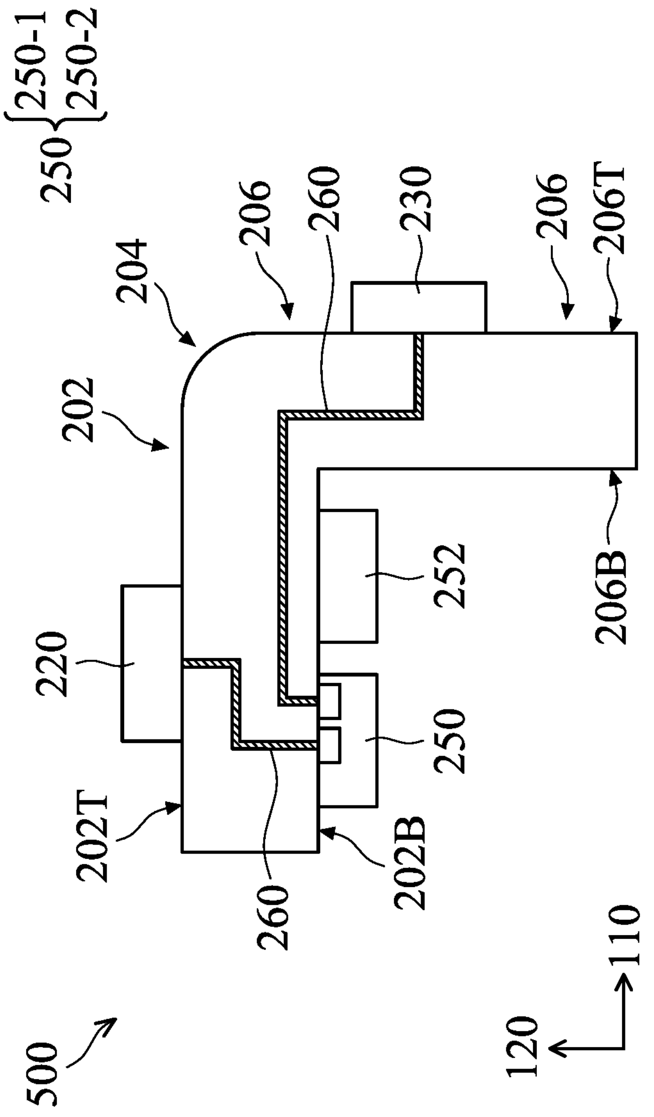
FIG. 2A is a side view of the antenna module of FIG. 1, showing the arrangement of antenna arrays and radio frequency integrated circuits (RFICs) in accordance with some embodiments of the disclosure.
Figure 2B:
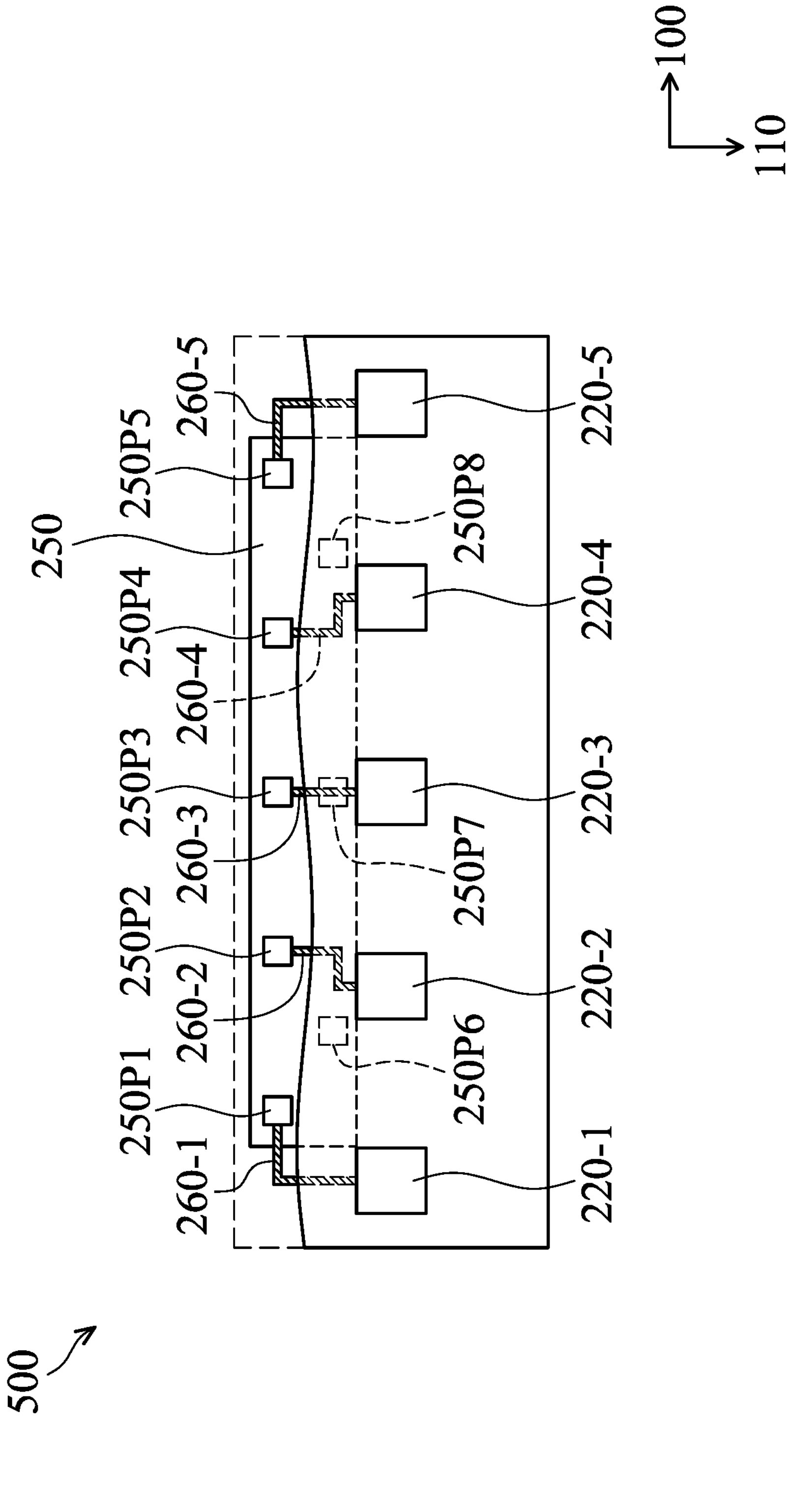
FIG. 2B is a plan view of the antenna module of FIG. 1, showing the connections between an antenna array disposed on a first planar portion of a dielectric substrate and the corresponding antenna port groups of the RFIC in accordance with some embodiments of the disclosure.
Figure 2C:
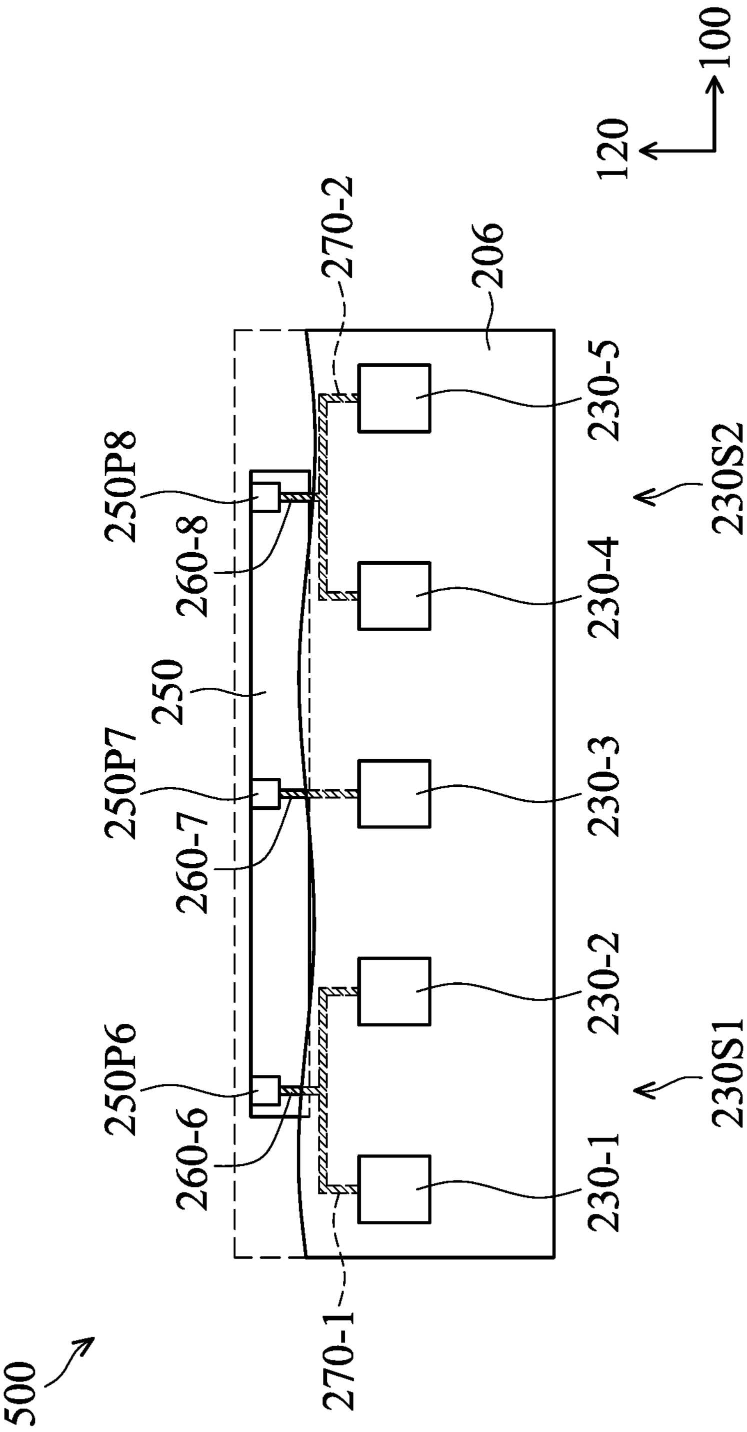
FIG. 2C is a plan view of the antenna module of FIG. 1, showing the connections between an antenna array disposed on a second planar portion of the dielectric substrate and the corresponding antenna port groups of the RFIC in accordance with some embodiments of the disclosure.

FIG. 1 is a perspective view of an antenna module 500 (including antenna modules 500A, 500B, 500C, 500D, 500E, 500F, 500G, 500H, 500I, 500J and 500K shown in the following figures) for multi-broadband (e.g., dual-broadband) and multi-polarization (e.g., dual-polarization) communication in accordance with some embodiments of the disclosure. FIG. 2A is a side view of the antenna module 500 of FIG. 1 along a direction 100, showing the arrangements of antenna arrays 220, 230 and a radio frequency integrated circuit (RFIC) 250 in accordance with some embodiments of the disclosure. FIG. 2B is a side view of the antenna module 500 of FIG. 1 along a direction 120, showing the electrical connections between an antenna array 220 disposed on a planar portion 202 of a dielectric substrate 200 and the corresponding antenna port groups 250P1, 250P2, 250P3, 250P4 and 250P5 of the RFIC 250 in accordance with some embodiments of the disclosure. FIG. 2C is a side view of the antenna module 500 of FIG. 1 along a direction 110, showing the electrical connections between an antenna array 230 disposed on a planar portion 206 of the dielectric substrate 200 and the corresponding antenna port group 250P6, 250P7 and 250P8 of the RFIC 250 in accordance with some embodiments of the disclosure. For illustration of the reference directions labeled in the figures, the direction 100 is defined as the row direction of the antenna arrays 220, 230. The direction 110 is defined as the normal direction of the planar portion 206 of the dielectric substrate 200. In addition, the direction 120 is defined as the normal direction of the planar portion 202 of a dielectric substrate 200. The direction 100 is substantially perpendicular to the directions 110 and 120. The direction 110 is substantially perpendicular to the directions 100 and 120. The direction 120 is substantially perpendicular to the directions 100 and 110. In addition, for illustration of the relationship of the electrical connections between the antenna arrays 220, 230 and corresponding antenna port groups of the RFIC 250, portions of the dielectric substrate 200 may be hidden (drawn in dashed lines) to expose portions of the RFIC 250 and the conductive trace groups (drawn in solid lines) in the side views of FIGS. 2B and 2C.

As shown in FIG. 1, the antenna module 500 includes the dielectric substrate 200, the antenna arrays 220, 230, and the RFIC 250. The dielectric substrate 200 may have an L-shape in the side view (FIG. 2A). In some embodiments, the dielectric substrate 200 includes planar portions 202, 206 and a bent portion 204. The planar portion 202 may face the direction 120. The planar portion 206 may face the direction 110. In other words, the normal directions of the planar portions 202 and 206 may parallel to the directions 120 and 110, respectively. In addition, the planar portions 202 and 206 may have a substantially rectangular shape and extend along the direction 100 for the antenna arrays 220, 230 arranged on top surfaces 202T and 206T of the planar portions 202 and 206. Furthermore, the bent portion 204 is connected between the planar portions 202 and 206. The dielectric substrate 200 may be single-layered structure or multi-layered structure. In some embodiments, the dielectric substrate 200 is made of a material including an organic material or an inorganic material, such as FR4 material, FR5 material, bismaleimide triazine (BT) resin material, glass, ceramic, molding compound, liquid crystal polymer, glass cloth based material, epoxy resin, ferrite, silicon, another applicable material or a combination thereof.

In some embodiments, the dielectric substrate 200 includes conductive trace groups 260 composed of conductive layers and vias (not shown) formed in the dielectric substrate 200 for electrical connections between the antenna arrays 220, 230 and corresponding antenna port groups 250P1 to 250P8 of the RFIC 250.

The antenna array 220 is arranged on the top surface 202T of the planar portion 202. In some embodiments, the antenna array 220 is a one-dimensional array (i.e., an array of 1×m, wherein m is integer equal to or greater than two) including a first number of separated antennas, for example, five antennas 220-1, 220-2, 220-3, 220-4 and 220-5, periodically arranged in a row along the direction 100 (the row direction). The antenna array 220 may cover a portion of the top surface 202T of the planar portion 202. In addition, the antennas 220 may be spaced apart to edges (not shown) of the top surface 202T of the planar portion 202. In some embodiments, the antennas 220-1, 220-2, 220-3, 220-4 and 220-5 include various antenna types, such as patch antennas, dipole antennas, monopole antennas, loop antennas, slot antennas, dielectric resonator antennas (DRAs), or a combination thereof. It should be noted that the types of the antennas 220-1, 220-2, 220-3, 220-4 and 220-5 are not limited to the disclosed embodiment. In some embodiments, the antennas 220-1, 220-2, 220-3, 220-4 and 220-5 radiate signals alone the direction 120.

The antenna array 230 is arranged on a top surface 206T of the planar portion 206. In some embodiments, the antenna array 230 is a one-dimensional array (i.e., an array of 1×n, wherein n is integer equal to or greater than one) including a second number of separated antennas, for example, five antennas 230-1, 230-2, 230-3, 230-4 and 230-5, periodically arranged in a row along the direction 100 (the row direction). In some embodiments, the first number is the same or different from the second number. The antenna array 230 may cover a portion of the top surface 206T of the planar portion 206. In addition, the antennas 230 may be spaced apart to edges (not shown) of the top surface 206T of the planar portion 206. In some embodiments, the antennas 230-1, 230-2, 230-3, 230-4 and 230-5 include various antenna types, such as patch antennas, dipole antennas, monopole antennas, loop antennas, slot antennas, dielectric resonator antennas (DRAs), or a combination thereof. It should be noted that the types of the antennas 230-1, 230-2, 230-3, 230-4 and 230-5 are not limited to the disclosed embodiment. In some embodiments, the antennas 230-1, 230-2, 230-3, 230-4 and 230-5 radiate signals alone the direction 110 or the opposite direction of the direction 110.

In some embodiments, the antenna module 500 includes a grounding layer (not shown) disposed in the dielectric substrate 200 and below the antenna arrays 220 and 230. The grounding layer may be formed between the dielectric layers (not shown) of the dielectric substrate 200 and separated from the antenna arrays 220 and 230. In addition, the grounding layer may be formed inside the dielectric substrate 200 and is not exposed from surfaces of the dielectric substrate 200. In some embodiments, the grounding layer may be exposed from the surfaces of the dielectric substrate 200. In some embodiments, the grounding layer may be disposed on a bottom surface 202B of the planar portion 202 (or a bottom surface 206B of the planar portion 206) of the dielectric substrate 200. In some embodiments, the grounding layer may be isolated from the antenna arrays 220 and 230. In some embodiments, the grounding layer 210 may be connected to the antenna array 220 and/or the antenna array 230, which depends on antenna types or antenna design requirements, for example, antenna array 230 is a PIFA antenna.

As shown in FIG. 1, the radio frequency integrated circuit (RFIC) 250 is disposed on the dielectric substrate 200. In addition, the RFIC 250 is disposed on the bottom surface 202B of the planar portion 202 (or the bottom surface 206B of the planar portion 206) opposite the antenna array 220 (or the antenna array 230). Furthermore, the grounding layer (not shown) may be interposed between the antenna array 220 (or the antenna array 230) and the RFIC 250.

In some embodiments, the RFIC 250 may be packaged as a chip including radio frequency (RF) circuits (not shown) and a plurality of antenna ports, for example, 32 antenna ports, connected to the corresponding RF circuits. The antenna ports of the RFIC 250 may be arranged in a third number of antenna port groups. The antenna ports of each antenna port group may be configured to receive or transmit different bandwidth/polarization signals from/to the corresponding antenna. For example, the 32 antenna ports of the RFIC 250 may be arranged in eight antenna port groups 250P1, 250P2, 250P3, 250P4, 250P5, 250P6, 250P7 and 250P8 to correspond to eight antennas. Each of the antenna port groups 250P1, 250P2, 250P3, 250P4, 250P5, 250P6, 250P7 and 250P8 may have four ports to correspond to one designated antenna. In some embodiments, the third number is limited by the design. For example, the third number may be less than the total of the first number and the second number. The antenna port groups 250P1 to 250P8 may be disposed along edges of the RFIC 250. The antenna port groups 250P1 to 250P8 may be connected and electrically coupled to the antenna arrays 220 and 230 by the conductive trace groups 260 (including conductive trace groups 260-1, 260-2, 260-3, 260-4, 260-5, 260-6, 260-7 and 260-8) to receive or transmit signals from/to the antenna arrays 220 and 230. Each of the conductive trace groups 260 may include a plurality of conductive traces connected to the corresponding antenna ports of the same antenna port group. The RF circuits of the RFIC 250 may be composed of transformers, mixers, power amplifiers, attenuators, phase shifters and switches to receive or transmit signals from/to the corresponding antenna port groups 250P1 to 250P8. The connections between the antenna port groups 250P1 to 250P8 of the RFIC 250 and the corresponding antennas of the antenna arrays 220 and 230 will be described in more detail with reference to the accompanying drawings.

As shown in FIG. 1, the antenna module 500 further includes a power management integrated circuit (PMIC) 252 disposed on the dielectric substrate 200 and beside the RFIC 250. In addition, the PMIC 252 is disposed on the bottom surface 202B of the planar portion 202 (or the bottom surface 206B of the planar portion 206) opposite the antenna array 220 (or the antenna array 230). In some embodiments, the PMIC 252 may be packaged as a chip.

In some embodiments, all of the antennas 220-1, 220-2, 220-3, 220-4 and 220-5 of the antenna array 220 on the planar portion 202 of the dielectric substrate 200 are individually connected to the different antenna port groups 250P1, 250P2, 250P3, 250P4 and 250P5 of the RFIC 250-1 by separated conductive trace groups 260-1, 260-2, 260-3, 260-4 and 260-5, as shown in FIG. 2B. In some embodiment, the antennas 220-1, 220-2, 220-3, 220-4 and 220-5 of the antenna array 220 and the antenna port groups 250P1, 250P2, 250P3, 250P4 and 250P5 of the RFIC 250-1 are in one-to-one relationship. For example, the antenna 220-1 is connected and electrically coupled to the single corresponding antenna port group 250P1 by the conductive trace group 260-1. The antenna 220-2 is connected and electrically coupled to the single corresponding antenna port group 250P2 by the conductive trace group 260-2. The antenna 220-3 is connected and electrically coupled to the single corresponding antenna port group 250P3 by the conductive trace group 260-3. The antenna 220-4 is connected and electrically coupled to the single corresponding antenna port group 250P4 by the conductive trace group 260-4. The antenna 220-5 is connected and electrically coupled to the single corresponding antenna port group 250P5 by the conductive trace group 260-5. It should be noted that the relationship of the connections between the antenna array 220 and the corresponding antenna port groups 250P1 to 250P5 of the RFIC 250 are not limited to the disclosed embodiments.

In some embodiments, the antenna array 230 on the planar portion 206 of the dielectric substrate 200 of the RFIC 250 may be arranged to include at least one sub-array, thereby ensuring all of the antennas of the antenna array 230 to be connected to the limited antenna port groups 250P6, 250P7 and 250P8 of the RFIC 250. The sub-array (e.g., sub-arrays 230S1 and 230S2) composed of at least two of the antennas 230-1, 230-2, 230-3, 230-4 and 230-5 may be connected to the same antenna port group (e.g., the antenna port group 250P6 or 250P8) of the RFIC 250 by the same conductive trace group (e.g., the conductive trace groups 260-6 or 260-8), as shown in FIG. 2C. In some embodiment, the antennas 230-1, 230-2, 230-3, 230-4 and 230-5 of the antenna array 230 and the corresponding antenna port groups 250P6, 250P7 and 250P8 of the RFIC 250 may be in many-to-one or one-to-one relationship. For example, the sub-array 230S1 composed of a portion of the antennas 230-1, 230-2, 230-3, 230-4 and 230-5, such as the antennas 230-1 and 230-2, are both connected and electrically coupled to the same antenna port group 250P6 by the single conductive trace group 260-6. The sub-array 230S2 composed of another portion of the antennas 230-1, 230-2, 230-3, 230-4 and 230-5, such as the antennas 230-4 and 230-5, are both connected and electrically coupled to the same antenna port group 250P8 by the single conductive trace group 260-8. Therefore, the more number of the antennas (including the ten antennas 220-1 to 220-5 and 230-1 to 230-5) of the antenna arrays 220 and 230 can be connected to the less number of antenna port groups (including the eight antenna port groups 250P1 to 250P8) of the RFIC 250. It should be noted that the number of the antennas in the same sub-array is not limited to the enclosed embodiments.

In some embodiments, the antennas of the antenna array 230 having the many-to-one relationship with the antenna port groups of the RFIC 250 are connected to each other by a connector component 270 (including the connector components 270-1 and 270-2). For example, the antennas 230-1 and 230-2 of the same antenna sub-array 230S1 may be first connected to each other by a connector component 270-1, and then the connector component 270-1 may be connected to the antenna port group 250P6 of the RFIC 250 by the conductive trace group 260-6. In addition, terminals of the conductive trace group 260-6 may be directly connected to the connector component 270-1 and the antenna port group 250P6 of the RFIC 250. For example, the antennas 230-4 and 230-5 of the same antenna sub-array 230S2 may be first connected to each other by a connector component 270-1, and then the connector component 270-2 may be connected to the antenna port group 250P8 of the RFIC 250 by the conductive trace group 260-8. In addition, terminals of the conductive trace group 260-8 may be directly connected to the connector component 270-2 and the antenna port group 250P8 of the RFIC 250. In some embodiments, the connector component 270 includes a divider/combiner.

In some embodiments, the other portion of the antennas 230-1, 230-2, 230-3, 230-4 and 230-5, such as the antenna 230-3, and the corresponding port 250P7 of the RFIC 250 may be in the one-to-one relationship. For example, the antenna 230-3 is connected and electrically coupled to the corresponding antenna port group 250P7 by the single conductive trace group 260-7. In addition, terminals of the conductive trace group 260-7 may be directly connected to the antenna 230-3 and the antenna port group 250P7 of the RFIC 250. It should be noted that the relationship of the connections between the antenna array 230 and the corresponding antenna port groups 250P6, 250P7 and 250P8 of the RFIC 250 are not limited to the disclosed embodiments.

FIGS. 3, 4, 5, 6, 7, 8, 9, 10, 11, 12, and 13 are side views of the antenna modules 500A, 500B, 500C, 500D, 500E, 500F, 500G, 500H, 500I, 500J and 500K along the direction 110, showing the arrangements and connections between the antenna array 230 disposed on the planar portion 206 of the dielectric substrate 200 and the corresponding antenna port groups of the RFIC 250 in accordance with some embodiments of the disclosure. Elements of the embodiments hereinafter, that are the same or similar as those previously described with reference to FIGS. 1 and 2A-2C, are not repeated for brevity.

Figure 3:
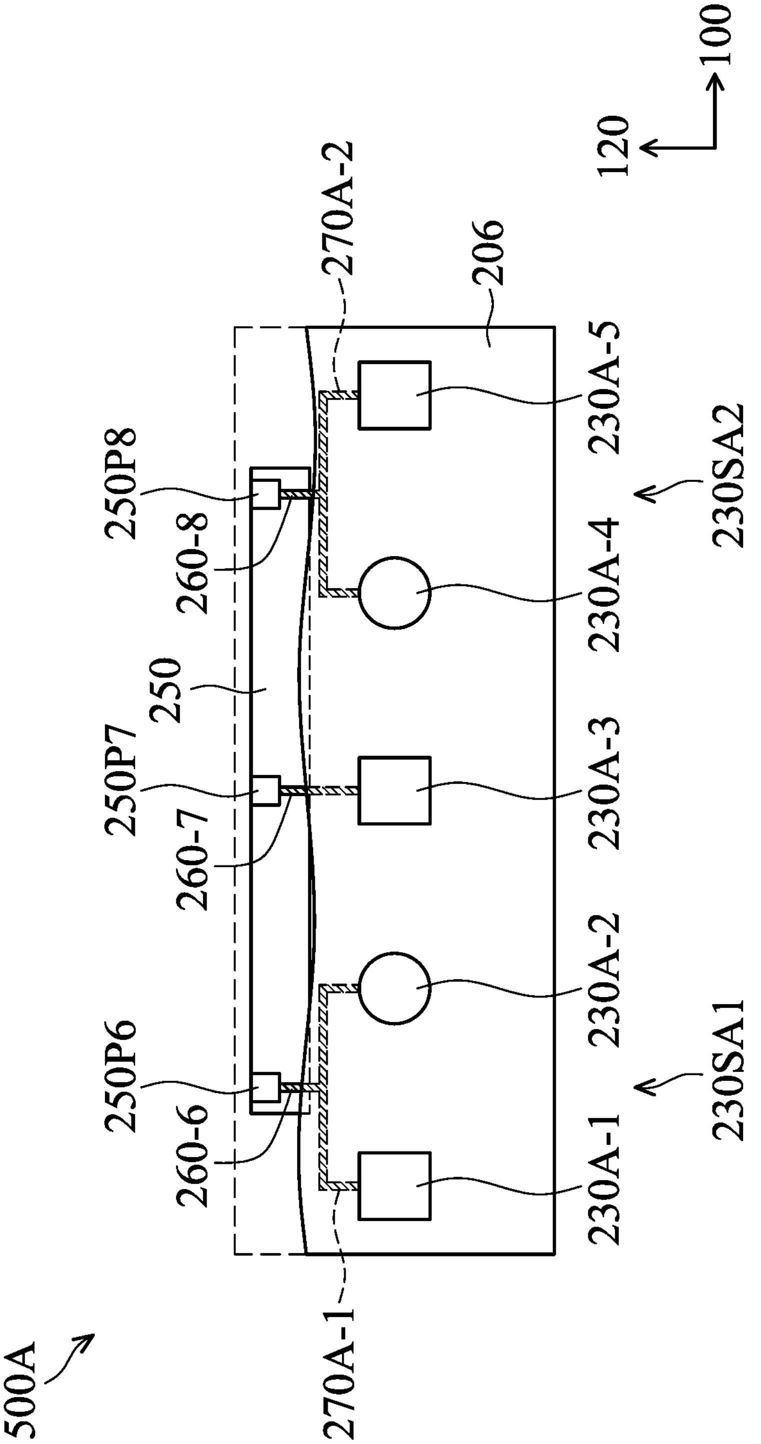
FIGS. 3, 4, 5, 6, 7, 8, 9, 10, 11, 12, and 13 are plan views of a portion of the antenna module, showing the arrangements and connections between the antenna array disposed on a second planar portion of a dielectric substrate and the corresponding antenna port groups of the RFIC in accordance with some embodiments of the disclosure.

In some embodiments, the antennas of the same sub-array of the antenna array 230 have different antenna types from each other. As shown in FIG. 3, in the antenna module 500A, the antenna array 230 includes antennas 230A-1, 230A-2, 230A-3, 230A-4 and 230A-5 corresponding to the three antenna port groups 250P6 to 250P8 of the RFIC 250. In addition, the antenna array 230 includes a sub-array 230SA1 composed of the antennas 230A-1 and 230A-2 and a sub-array 230SA2 composed of the antennas 230A-4 and 230A-5. The antennas 230A-1 and 230A-2 of the same antenna sub-array 230SA1 are both connected to the same antenna port group 250P6 of the RFIC 250 by a connector component 270A-1 and the conductive trace group 260-6. The antennas 230A-4 and 230A-5 of the same antenna sub-array 230SA2 are both connected to the same antenna port group 250P8 of the RFIC 250 by a connector component 270A-2 and the conductive trace group 260-8. In some embodiments, the antennas 230A-4 and 230A-5 of the same antenna sub-array 230SA2 may have different antenna types. For example, the antenna 230A-1 may be a patch antenna, and the antenna 230A-2 may be a dipole antenna. In addition, the antennas 230A-1 and 230A-2 of the same antenna sub-array 230SA1 may be operated in the same or different radiation directions and/or polarizations. The antennas 230A-1 and 230A-2 of the same antenna sub-array 230SA1 may be operated in the same frequency band. Similarly, the antennas 230A-4 and 230A-5 of the same antenna sub-array 230SA2 may have different antenna types. For example, the antenna 230A-4 may be a loop antenna, and the antenna 230A-5 may be a slot antenna. In addition, the antennas 230A-4 and 230A-5 of the same antenna sub-array 230SA2 may be operated in the same or different radiation directions and/or polarizations. The antennas 230A-4 and 230A-5 of the same antenna sub-array 230SA1 may be operated in the same frequency band. In some embodiments, the antenna type of the antenna 230A-3 connected to the antenna port group 250P7 of the RFIC 250 may is the same as or different from that the antenna type of the antennas 230A-1, 230A-2, 230A-4 and 230A-5 of the same antenna array 230. It should be noted that the antenna type of the antennas 230A-1, 230A-2, 230A-3, 230A-4 and 230A-5 is not limited to the disclosed embodiment.

Figure 4:
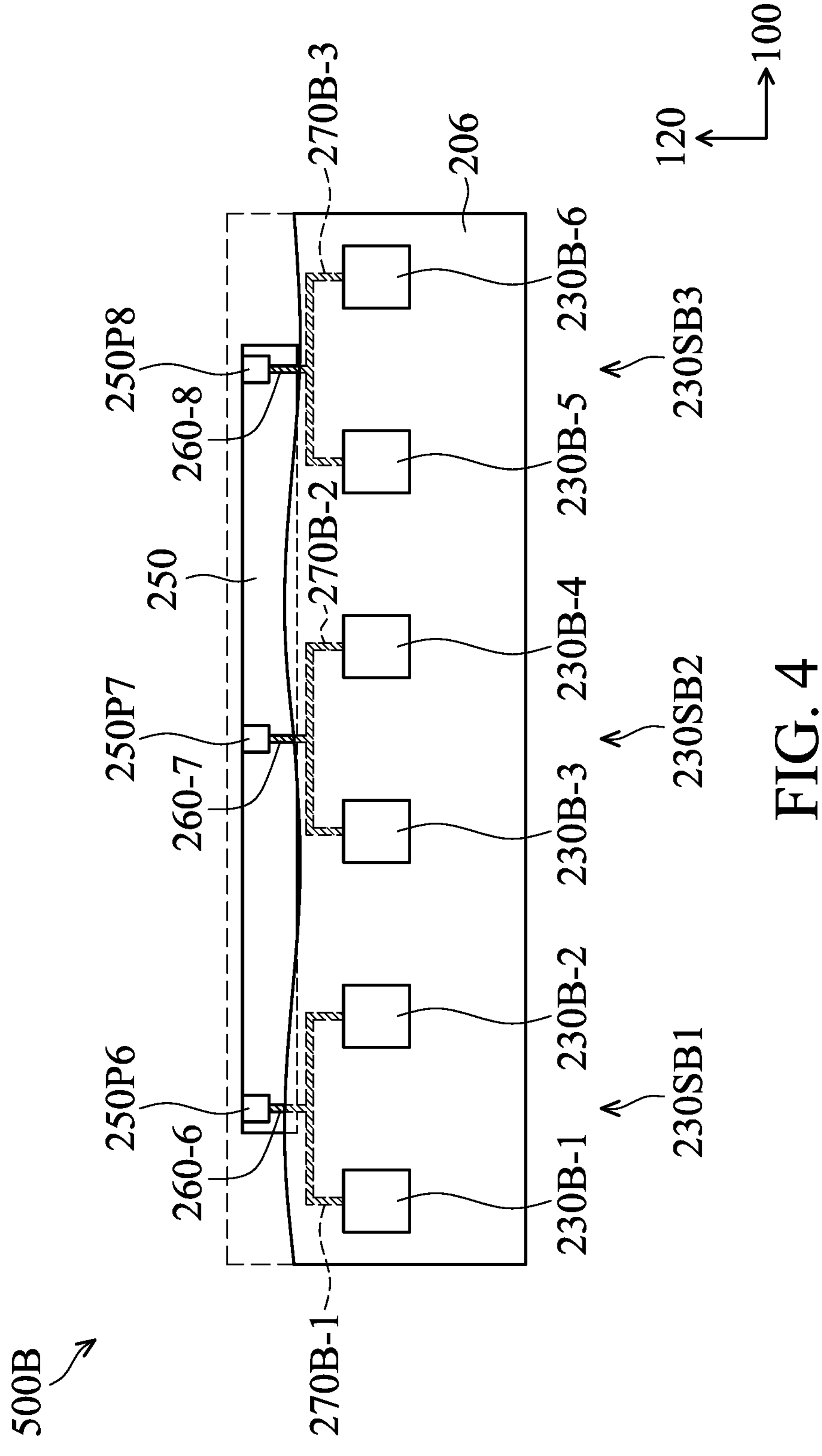

In some embodiments, the antenna array 230 may have any number of the antennas corresponding to the limited antenna port groups of the RFIC 250. As shown in FIG. 4, in the antenna module 500B, the antenna array 230 includes six antennas 230B-1, 230B-2, 230B-3, 230B-4, 230B-5 and 230B-6 corresponding to the three antenna port groups 250P6 to 250P8 of the RFIC 250. In addition, the antenna array 230 includes a sub-array 230SB1 composed of the antennas 230B-1 and 230B-2, a sub-array 230SB2 composed of the antennas 230B-3 and 230B-4 and a sub-array 230SB3 composed of the antennas 230B-5 and 230B-6. The antennas 230B-1 and 230B-2 of the same antenna sub-array 230SB1 are both connected to the same antenna port group 250P6 of the RFIC 250 by a connector component 270B-1 and the conductive trace group 260-6. The antennas 230B-3 and 230B-4 of the same antenna sub-array 230SB2 are both connected to the same antenna port group 250P7 of the RFIC 250 by a connector component 270B-2 and the conductive trace group 260-7. In addition, the antennas 230B-5 and 230B-6 of the same antenna sub-array 230SB3 are both connected to the same antenna port group 250P8 of the RFIC 250 by a connector component 270B-3 and the conductive trace group 260-8. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna module 500A may be implemented in the antenna packages 501 and 502 whenever applicable.

Figure 5:
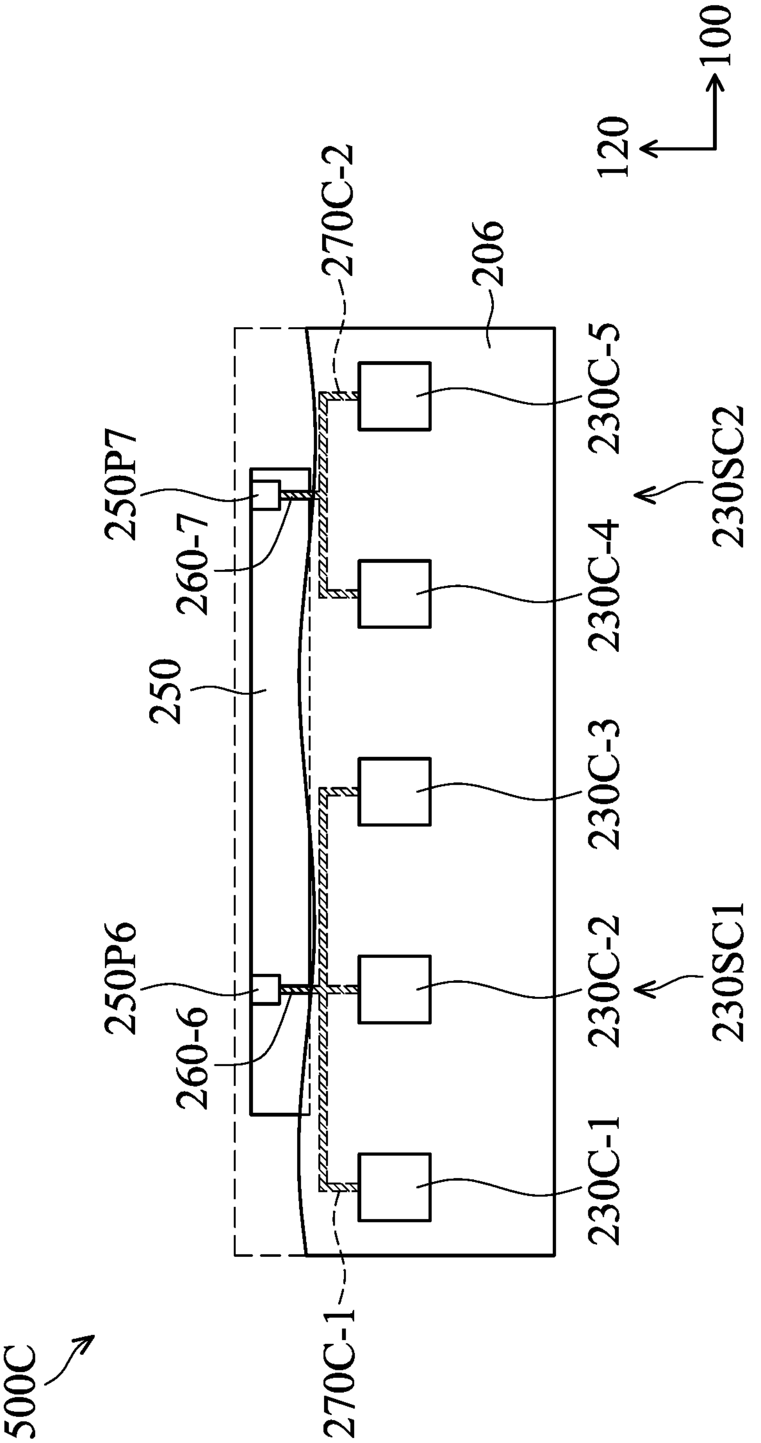

In some embodiments, the sub-array of the antenna array 230 may be composed of any number of the antennas. As shown in FIG. 5, in the antenna module 500C, the antenna array 230 includes antennas 230C-1, 230C-2, 230C-3, 230C-4 and 230C-5 corresponding to the two antenna port groups 250P6 and 250P7 of the RFIC 250. In addition, the antenna array 230 includes a sub-array 230SC1 composed of three antennas 230C-1, 230C-2 and 230C-3 and a sub-array 230SC2 composed of two antennas 230C-4 and 230C-5. The antennas 230C-1, 230C-2 and 230C-3 of the same antenna sub-array 230SC1 are all connected to the same antenna port group 250P6 of the RFIC 250 by a connector component 270C-1 and the conductive trace group 260-6. The antennas 230C-4 and 230C-5 of the same antenna sub-array 230SC2 are both connected to the same antenna port group 250P7 of the RFIC 250 by a connector component 270C-2 and the conductive trace group 260-7. In this embodiment, the antenna of the antenna array 230 of the antenna module 500C may not have one-to-one relationship with the antenna port group of the RFIC 250. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A and 500B may be implemented in the antenna packages 501 and 502 whenever applicable.

Figure 6:
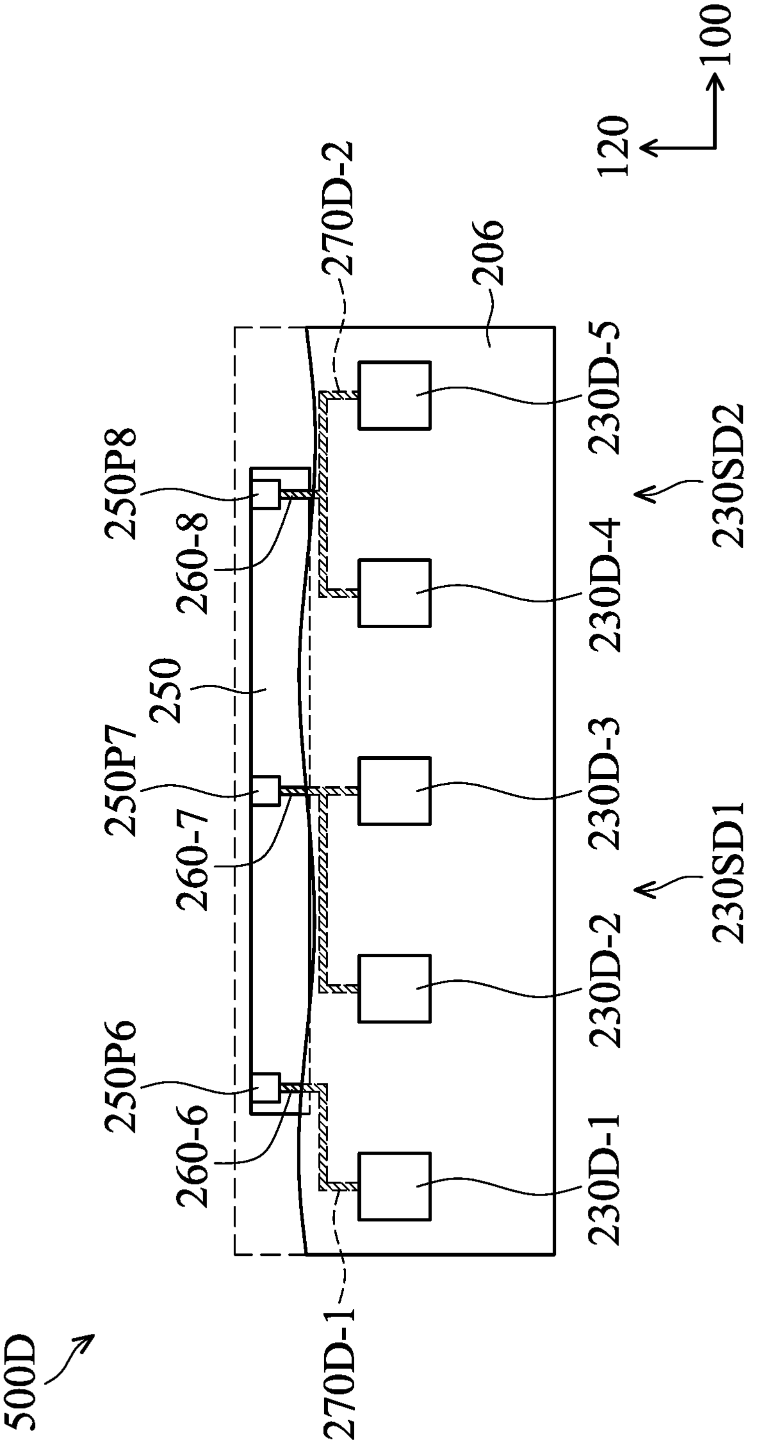

In some embodiments, the sub-array may be arranged on any position of the antenna array 230. As shown in FIG. 6, in the antenna module 500D, the antenna array 230 includes antennas 230D-1, 230D-2, 230D-3, 230D-4 and 230D-5 corresponding to the three ports 250P6 to 250P8 of the RFIC 250. The antenna 230D-1 of the antenna array 230 has one-to-one relationship with the corresponding antenna port group 250P6 of the RFIC 250. In addition, the antenna array 230 includes sub-arrays 230SD1 and 230SD2 arranged in the middle and right side of the one-dimensional antenna array 230. In some embodiments, the sub-arrays 230SD1 and 230SD2 are arranged side by side. The sub-array 230SD1 may be composed of the antennas 230D-2 and 230D-3. The sub-array 230SD2 may be composed of the antennas 230D-4 and 230D-5. The antennas 230D-4 and 230D-5 may be arranged outside the antennas 230D-2 and 230D-3 of the sub-array 230SD1. The antennas 230D-2 and 230D-3 of the same antenna sub-array 230SD1 are both connected to the same antenna port group 250P7 of the RFIC 250 by a connector component 270D-1 and the conductive trace group 260-7. The antennas 230D-4 and 230D-5 of the same antenna sub-array 230SD2 are both connected to the same antenna port group 250P8 of the RFIC 250 by a connector component 270D-2 and the conductive trace group 260-8. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500C may be implemented in the antenna packages 501 and 502 whenever applicable.

Figure 7:
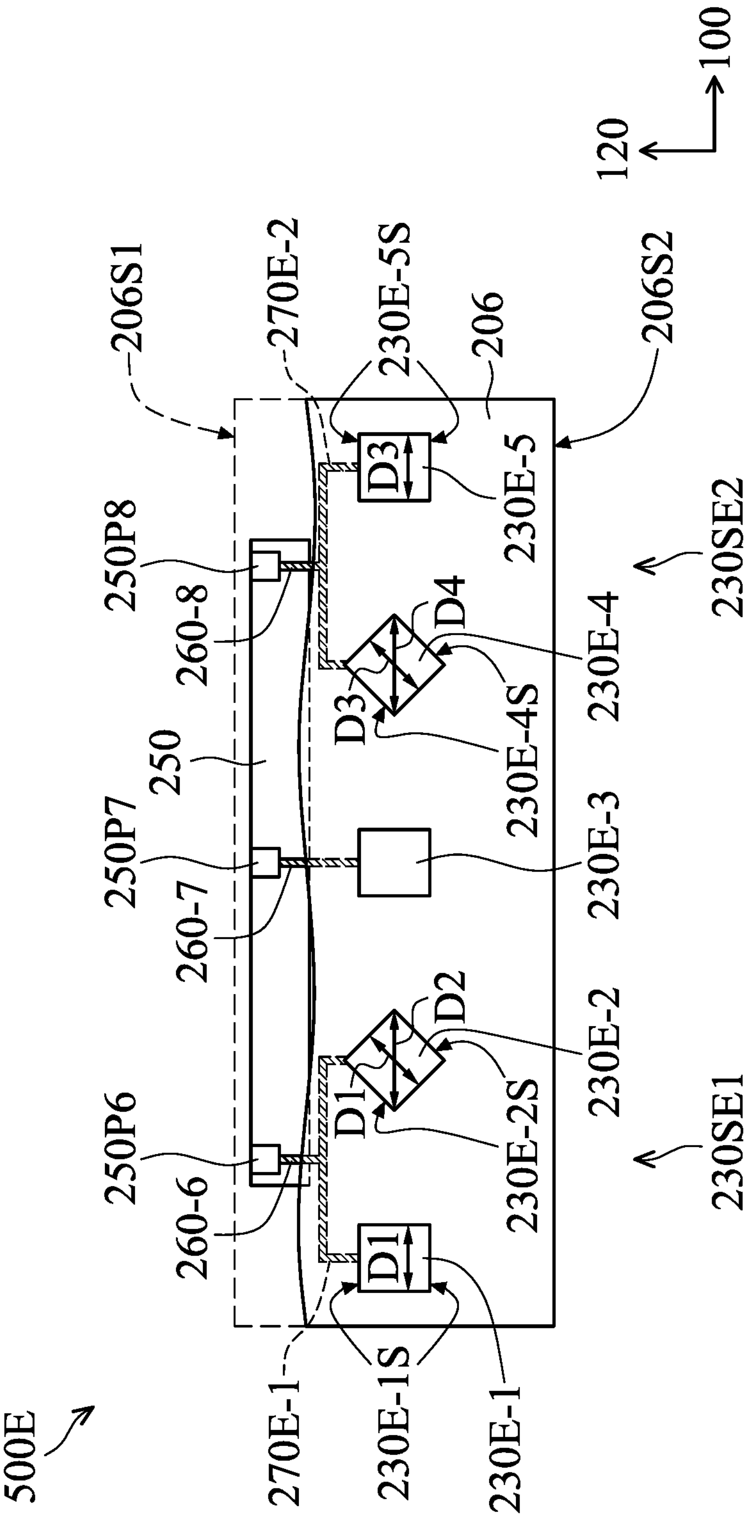

In some embodiments, the antennas of the same sub-array may be arranged in different orientations. Therefore, the antennas of the sub-array having different sizes (for the operations in different frequency bands) may be arranged in the planar portion 206 having a limited area. As shown in FIG. 7, in the antenna module 500E, the antenna array 230 includes antennas 230E-1, 230E-2, 230E-3, 230E-4 and 230E-5 corresponding to the three antenna port groups 250P6 to 250P8 of the RFIC 250. The antenna array 230 includes sub-arrays 230SE1 and 230SE2 arranged in the left and right sides of the one-dimensional antenna array 230. The sub-array 230SE1 may be composed of the antennas 230E-1 and 230E-2 both connected to the same antenna port group 250P6 of the RFIC 250 by a connector component 270E-1 and the conductive trace group 260-6. The sub-array 230SE2 may be composed of the antennas 230E-4 and 230E-5 both connected to the same antenna port group 250P8 of the RFIC 250 by a connector component 270E-2 and the conductive trace group 260-8. In some embodiments, the sub-arrays 230SE1 and 230SE2 are separated from each other by the antenna 230E-3. In addition, the antenna 230E-3 of the antenna array 230 having one-to-one relationship with the corresponding antenna port group 250P7 of the RFIC 250 may be arranged in the middle of the one-dimensional antenna array 230.

In some embodiments, the antennas 230E-1 and 230E-2 of the sub-array 230SE1 may be arranged in different orientations. For example, the antennas 230E-1 and 230E-2 may both have a square shape with the same length D1. A pair of opposite edges 230E-1S of antenna 230E-1 may be arranged substantially parallel to the corresponding edges 206S1 and 206S2 of the planar portion 206, as shown in FIG. 7. The antenna 230E-2 may have 45 degree clockwise or anticlockwise rotation related to the antenna 230E-1. Therefore, a pair of opposite edges 230E-2S of antenna 230E-2 may not be parallel to the edges 206S1 and 206S2 of the planar portion 206. In the direction 100 (the row direction). The antenna 230E-2 may have a dimension D2 different from the dimension (i.e., the length D1) of the antenna 230E-1. In addition, the adjacent edges 230E-1S and 230E-2S of the antennas 230E-1 and 230E-2 of the sub-array 230SE1 may not be parallel with each other. In some other embodiments, the antennas 230E-1 and 230E-2 may have different lengths. For example, the length of the antenna 230E-2 may be greater than the length D1 of the antenna 230E-1, so that of the antenna 230E-2 may have the operated frequency lower than the operated frequency of the antenna 230E-1.

Similarly, the antennas 230E-4 and 230E-5 may both have a square shape with the same length D3 that is the same or different form the length D1. The antenna 230E-5 may have the same orientation with the antenna 230E-1. The antenna 230E-4 may have 45 degree clockwise or anticlockwise rotation related to the antenna 230E-5. In the direction 100 (the row direction). The antenna 230E-4 may have a dimension D4 different from the dimension (i.e., the length D3) of the antenna 230E-5. In addition, the adjacent sides 230E-4S and 230E-5S of the antennas 230E-4 and 230E-5 of the sub-array 230SE2 may not be parallel with each other. In some other embodiments, the antennas 230E-4 and 230E-5 may have different lengths. For example, the length of the antenna 230E-4 may be greater than the length D3 of the antenna 230E-5, so that of the antenna 230E-4 may have the operated frequency lower than the operated frequency of the antenna 230E-5. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500D may be implemented in the antenna packages 501 and 502 whenever applicable.

Figure 8:
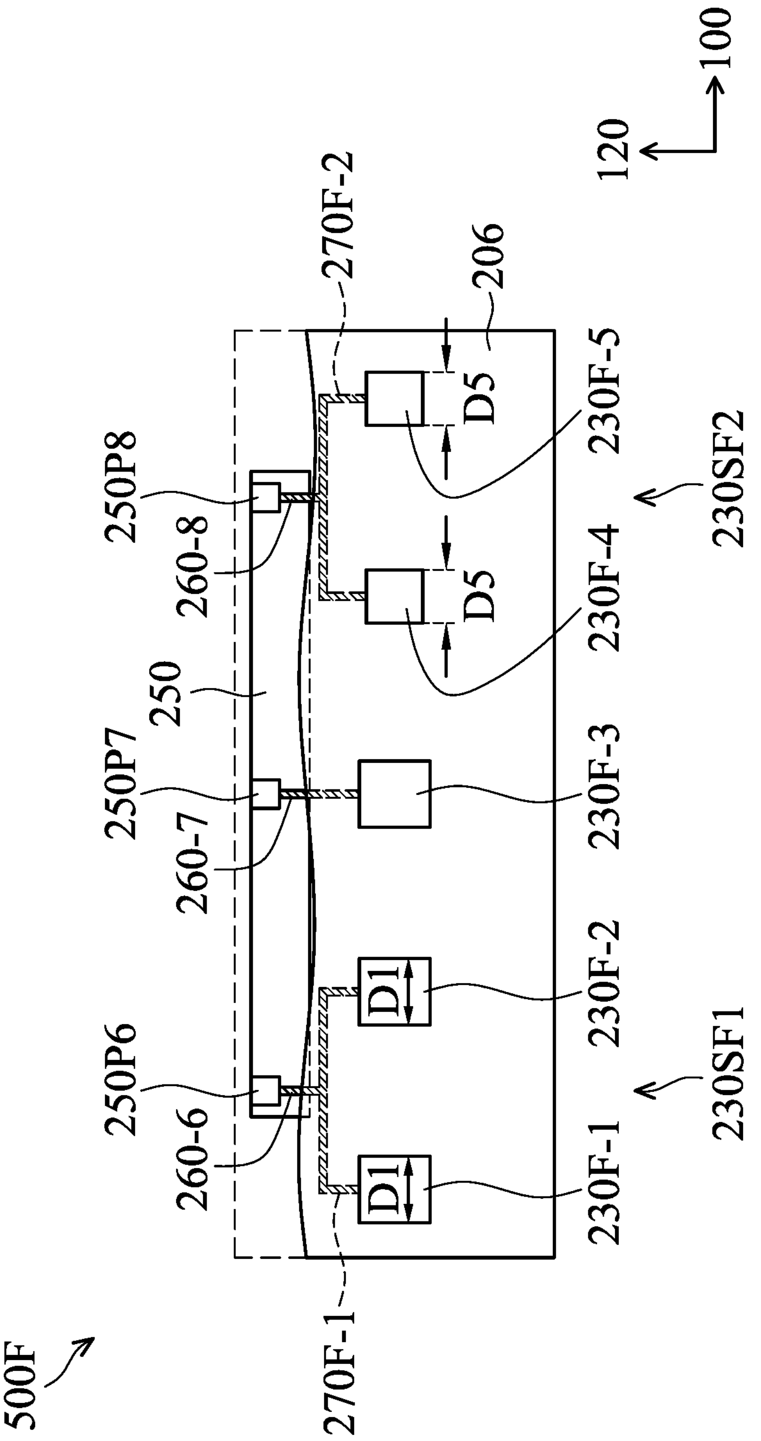

In some embodiments, the antennas of the different sub-arrays may be operated in different frequency bands including a low frequency band, a medium frequency band, a high frequency band or an ultra-high frequency band. As shown in FIG. 8, in the antenna module 500F, the antenna array 230 includes antennas 230E-1, 230E-2, 230E-3, 230E-4 and 230E-5 corresponding to the three antenna port groups 250P6 to 250P8 of the RFIC 250. The antenna array 230 includes sub-arrays 230SF1 and 230SF2 arranged in the left and right sides of the one-dimensional antenna array 230. The sub-array 230SF1 may be composed of the antennas 230E-1 and 230E-2 both connected to the same antenna port group 250P6 of the RFIC 250 by a connector component 270E-1 and the conductive trace group 260-6. The sub-array 230SF2 may be composed of the antennas 230E-4 and 230E-5 both connected to the same antenna port group 250P8 of the RFIC 250 by a connector component 270E-2 and the conductive trace group 260-8. In addition, the antenna 230E-3 of the antenna array 230 having one-to-one relationship with the corresponding antenna port group 250P7 of the RFIC 250 may be arranged in the middle of the one-dimensional antenna array 230. In some embodiments, the antennas 230E-1 and 230E-2 of the sub-array 230SF1 and the antennas 230E-4 and 230E-5 of the sub-array 230SF2 may be operated in in different frequency bands. For example, the antennas 230E-1 and 230E-2 of the sub-array 230SF1 may both have a square shape with the same length D1 and operated in a low frequency band. In addition, the antennas 230E-4 and 230E-5 of the sub-array 230SF2 may both have a square shape with the same length D5 and operated in a high frequency band. In some embodiments, the length D1 is greater than the length D5. It should be noted that the operated frequency band of the antennas of each of the sub-arrays is not limited to the disclosed embodiment. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500E may be implemented in the antenna packages 501 and 502 whenever applicable.

Figure 9:
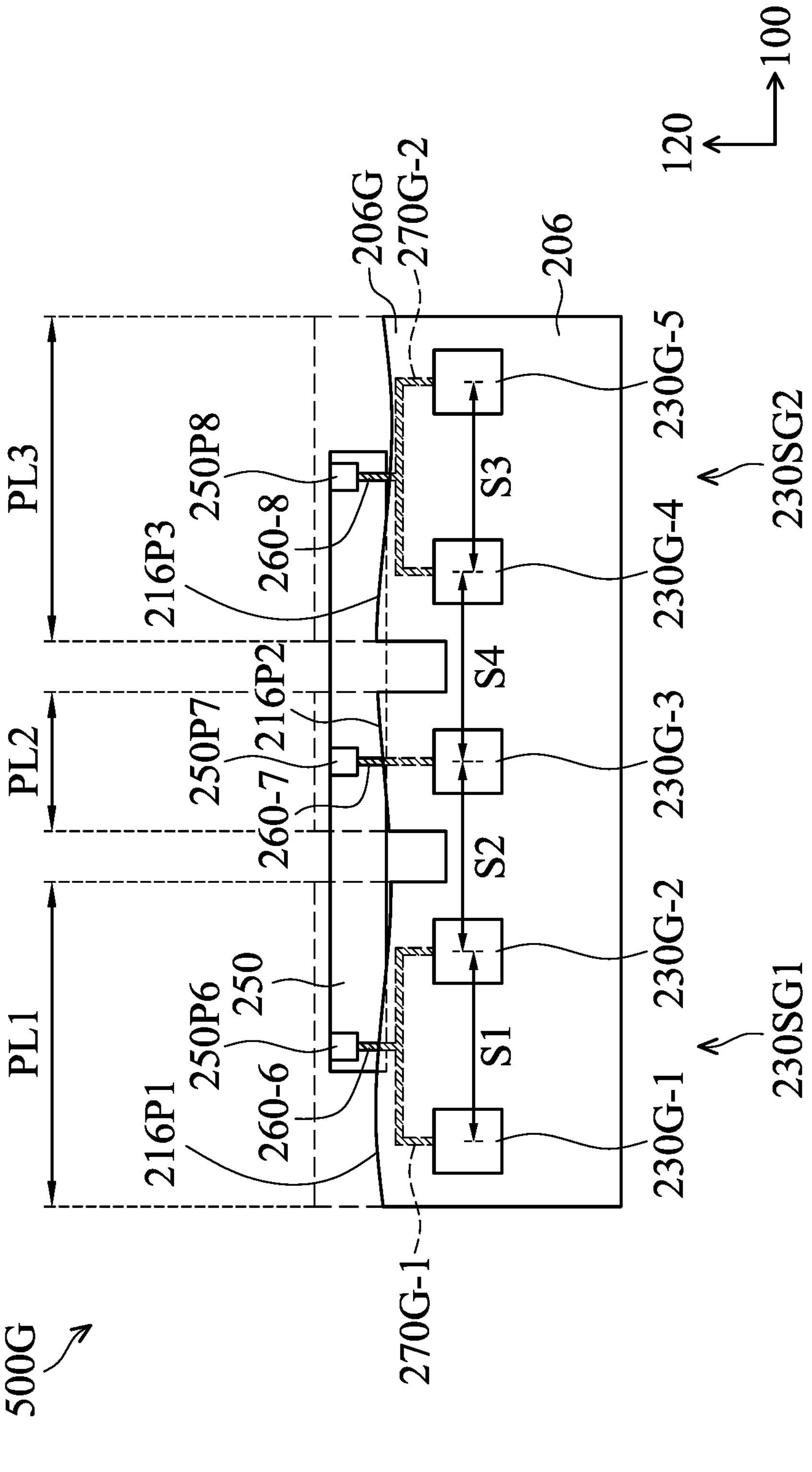

In some embodiments, a first space between the adjacent antennas of the same sub-array may be different from a second space between the antenna outside the sub-array and the adjacent antenna of the sub-array. The first space and second space may be individually optimized by the geometry of the planar portion 206 (e.g., the shape of the planar portion 206) or the gain of the antennas. As shown in FIG. 9, in the antenna module 500G, a planar portion 206G may include protruding portions 216P1, 216P2 and 216P3 protruding in the direction 120. The protruding portions 216P1, 216P2 and 216P3 may have lengths PL1, PL2 and PL3 along the direction 100. In some embodiments, the lengths PL1, PL2 and PL3 may be the same or different one another.

As shown in FIG. 9, the antenna array 230 includes antennas 230G-1, 230G-2, 230G-3, 230G-4 and 230G-5 corresponding to the three antenna port groups 250P6 to 250P8 of the RFIC 250. The antenna array 230 includes sub-arrays 230SG1 and 230SG2 arranged in the left and right sides of the one-dimensional antenna array 230. In addition, the sub-arrays 230SG1 and 230SG2 are arranged in the protruding portions 216P1 and 216P3, respectively. The sub-array 230SG1 may be composed of the antennas 230G-1 and 230G-2 both connected to the same antenna port group 250P6 of the RFIC 250 by a connector component 270G-1 and the conductive trace group 260-6. The sub-array 230SG2 may be composed of the antennas 230G-4 and 230G-5 both connected to the same antenna port group 250P8 of the RFIC 250 by a connector component 270G-2 and the conductive trace group 260-8. In addition, the antenna 230G-3 of the antenna array 230 having one-to-one relationship with the corresponding antenna port group 250P7 of the RFIC 250 may be arranged in the protruding portion 216P2.

As shown in FIG. 9, a space S1 between the adjacent antennas 230G-1 and 230G-2 of the sub-array 230SG1 may be defined by the length PL1 of the protruding portion 216P1 and/or the size (the length) of the antennas 230G-1 and 230G-2. A space S2 between the antenna 230G-3 outside the sub-array 230SG1 and the adjacent antenna 230G-2 of the sub-array 230SG1 may be defined by the length PL2 of the protruding portion 216P2, the space (not shown) between the protruding portions 216P1 and 216P2 along the direction 100 and/or the size (the length) of the antennas 230G-2 and 230G-3. In some embodiments, the space S1 is the same as or different from the space S2.

Similarly, a space S3 between the adjacent antennas 230G-4 and 230G-5 of the sub-array 230SG2 may be defined by the length P3 of the protruding portion 216P1 and/or the size (the length) of the antennas 230G-4 and 230G-5. A space S4 between the antenna 230G-3 outside the sub-array 230SG1 and the adjacent antenna 230G-4 of the sub-array 230SG2 may be defined by the length PL2 of the protruding portion 216P2, the space (not shown) between the protruding portions 216P21 and 216P3 along the direction 100 and/or the size (the length) of the antennas 230G-3 and 230G-4. In some embodiments, the space S3 is the same as or different from the space S4. In some embodiments, the space S3 is the same as or different from the space S1, and the space S2 is the same as or different from the space S4.

In some embodiments, the antennas 230G-1, 230G-2, 230G-3, 230G-4 and 230G-5 arranged with the specific spaces S1 to S4 may be disposed on the rectangular planar portion 206 without protruding portions to support specific frequency bands of operations. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500F may be implemented in the antenna packages 501 and 502 whenever applicable.

Figure 10:
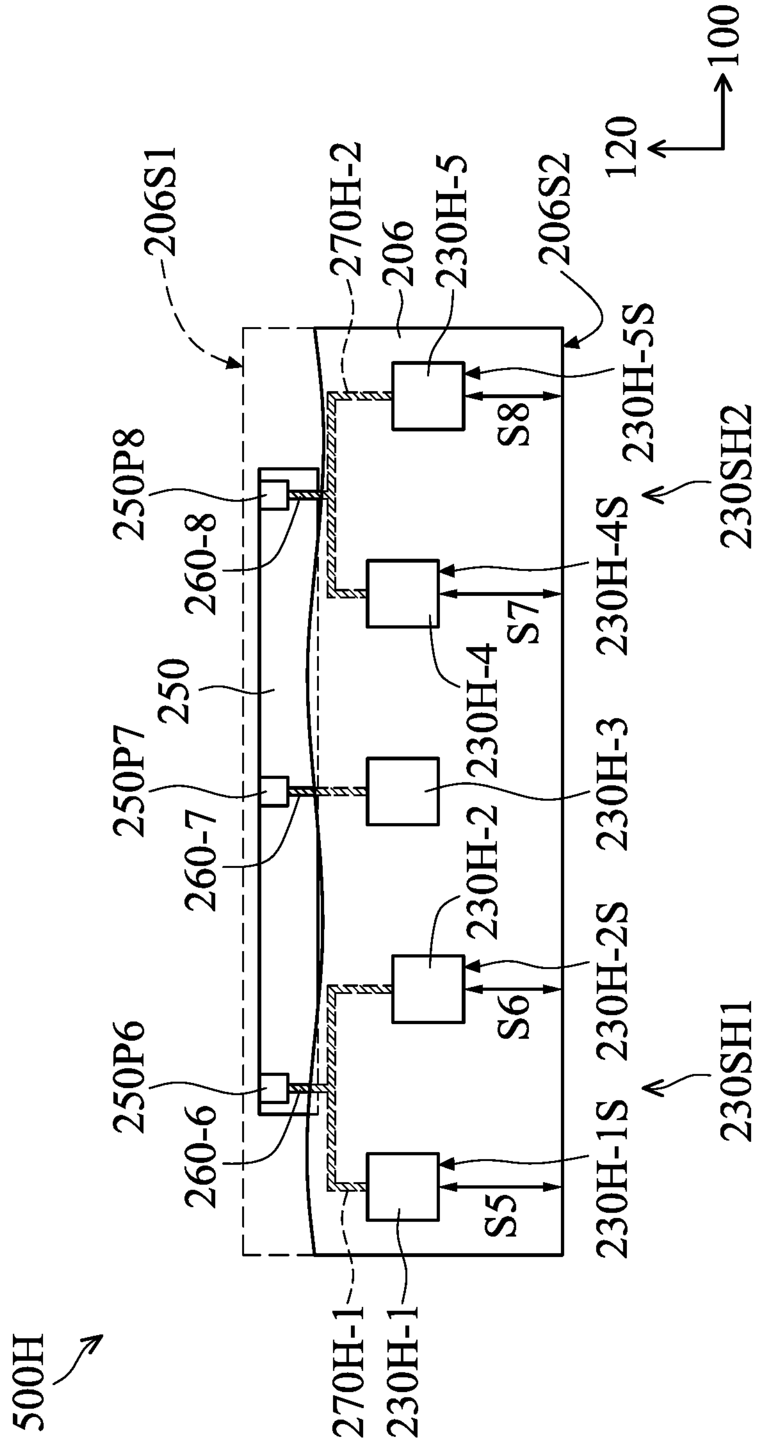

In some embodiments, the antennas of the same sub-array are arranged in a staggered manner along the row direction to increase design flexibility. As shown in FIG. 10, in the antenna module 500H, the antenna array 230 includes antennas 230H-1, 230H-2, 230H-3, 230H-4 and 230H-5 corresponding to the three antenna port groups 250P6 to 250P8 of the RFIC 250. The antenna array 230 includes sub-arrays 230SH1 and 230SH2 arranged in the left and right sides of the one-dimensional antenna array 230. The sub-array 230SH1 may be composed of the antennas 230H-1 and 230H-2 both connected to the same antenna port group 250P6 of the RFIC 250 by a connector component 270H-1 and the conductive trace group 260-6. The sub-array 230SH2 may be composed of the antennas 230H-4 and 230H-5 both connected to the same antenna port group 250P8 of the RFIC 250 by a connector component 270H-2 and the conductive trace group 260-8. In addition, the antenna 230H-3 of the antenna array 230 having one-to-one relationship with the corresponding antenna port group 250P7 of the RFIC 250 may be arranged in the middle of the one-dimensional antenna array 230 and outside the sub-arrays 230SH1 and 230SH2. In some embodiments, the antennas 230SH1 and 230SH2 of the same sub-array 230SH1 are arranged in a staggered manner along the direction 100. Therefore, a space S5 between the edge 206S2 and an adjacent edge 230H-1S of the antenna 230H-1 may be different from a space S6 between the edge 206S2 and an adjacent edge 230H-2S of the antenna 230H-2 along the direction 120. Similarly, the antennas 230SH4 and 230SH5 of the same sub-array 230SH2 are arranged in a staggered manner along the direction 100. Therefore, a spacing S7 between the edge 206S2 and an adjacent edge 230H-4S of the antenna 230H-4 may be different from a space S6 between the edge 206S2 and an adjacent edge 230H-5S of the antenna 230H-5 along the direction 120. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500G may be implemented in the antenna packages 501 and 502 whenever applicable.

Figure 11:
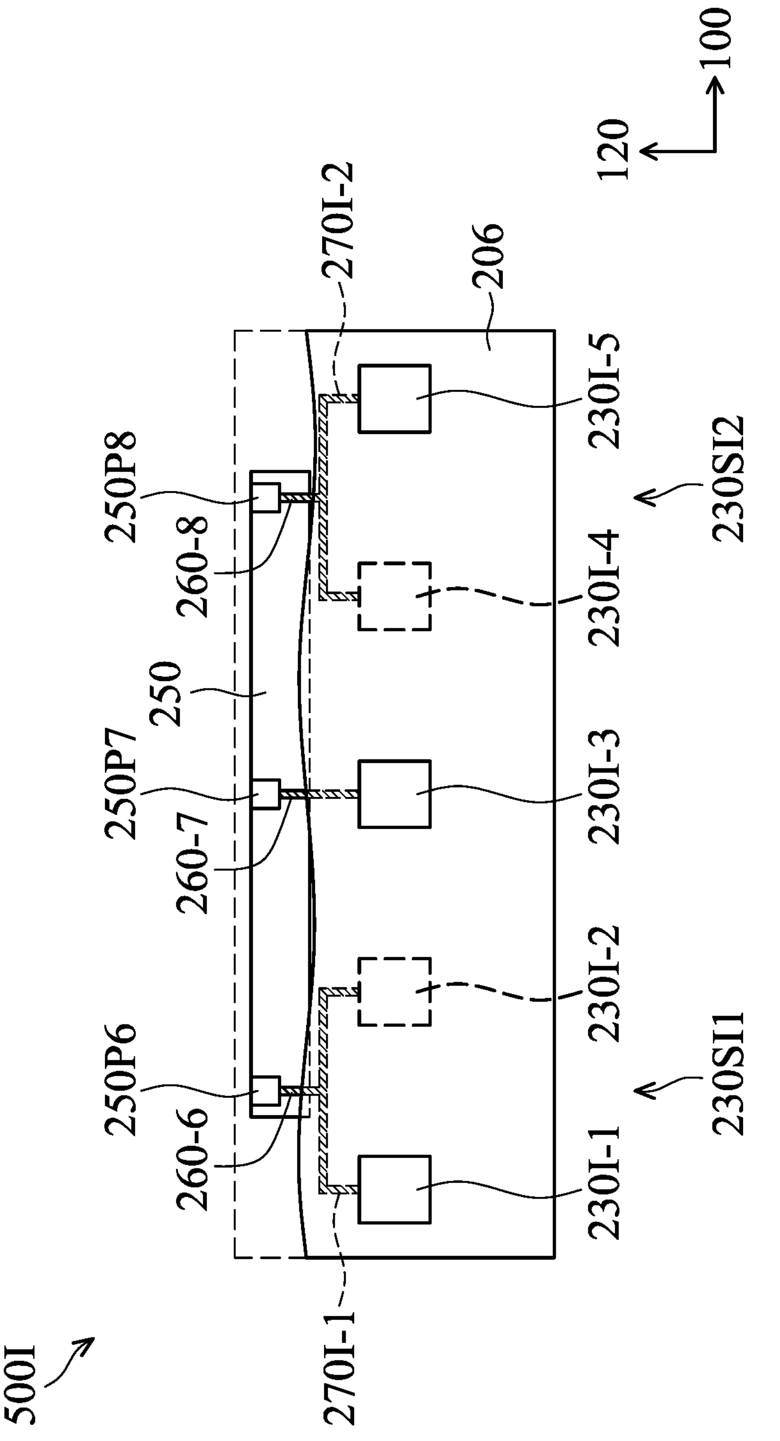

In some embodiments, the antennas of the same sub-array are positioned at different levels. As shown in FIG. 11, in the antenna module 500I, the antenna array 230 includes antennas 230I-1, 230I-2, 230I-3, 230I-4 and 230I-5 corresponding to the three antenna port groups 250P6 to 250P8 of the RFIC 250. The antenna array 230 includes sub-arrays 230SI1 and 230SI2 arranged in the left and right sides of the one-dimensional antenna array 230. The sub-array 230SI1 may be composed of the antennas 230I-1 and 230I-2 both connected to the same antenna port group 250P6 of the RFIC 250 by a connector component 270I-1 and the conductive trace group 260-6. The sub-array 230SI2 may be composed of the antennas 230I-4 and 230I-5 both connected to the same antenna port group 250P8 of the RFIC 250 by a connector component 270I-2 and the conductive trace group 260-8. In addition, the antenna 230I-3 of the antenna array 230 having one-to-one relationship with the corresponding antenna port group 250P7 of the RFIC 250 may be arranged in the middle of the one-dimensional antenna array 230 and outside the sub-arrays 230SI1 and 230SI2. In some embodiments, the antennas 230I-1 and 230I-2 of the same sub-array 230SI1 may be positioned at different levels. For example, in the sub-array 230SI1, the antenna 230I-1 may be disposed on and covering the top surface 206T the planar portion 206, and the antenna 230I-2 may be disposed embedded in the planar portion 206 (below the top surface 206T of the planar portion 206 (FIG. 1)). Therefore, the antennas 230I-1 and 230I-2 may not be coplanar with each other, so that the top surface 206T of the planar portion 206 (FIG. 1) is positioned between the antennas 230I-1 and 230I-2 along the direction 110. Similarly, in the sub-array 230SI2, the antenna 230I-4 may be disposed embedded in the planar portion 206 (below the top surface 206T of the planar portion 206 (FIG. 1)), and the antenna 230I-5 may be disposed on and covering the top surface 206T the planar portion 206. Therefore, the antennas 230I-4 and 230I-5 may not be coplanar with each other, so that the top surface 206T of the planar portion 206 (FIG. 1) is positioned between the antennas 230I-4 and 230I-5 along the direction 110. In addition, the antennas 230I-2 and 230I-4 may be positioned at different level of the planar portion 206 of the dielectric substrate 200. In other words, the antennas 230I-2 and 230I-4 may not be coplanar with each other. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500H may be implemented in the antenna packages 501 and 502 whenever applicable.

Figure 12:
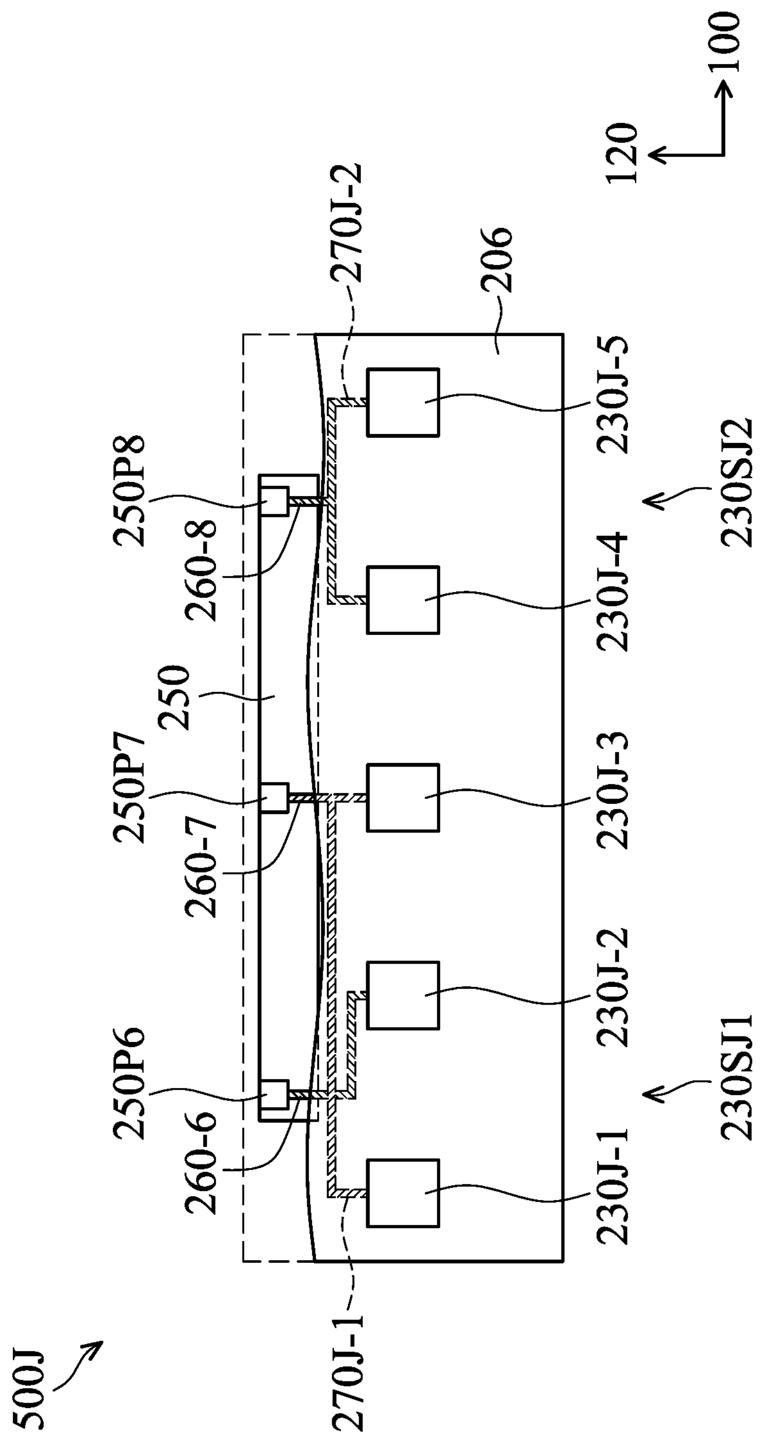

In some embodiments, the sub-array may be composed of the non-adjacent antennas. Any number of antennas may be interposed between the antennas of the same sub-array 230SJ1 along the row direction. As shown in FIG. 12, in the antenna module 500J, the antenna array 230 includes antennas 230J-1, 230J-2, 230J-3, 230J-4 and 230J-5 corresponding to the three antenna port groups 250P6 to 250P8 of the RFIC 250. The antenna array 230 includes sub-arrays 230SJ1 and 230SJ2 arranged in the left and right sides of the one-dimensional antenna array 230. The sub-array 230SJ1 may be composed of the antennas 230J-1 and 230J-3 both connected to the same antenna port group 250P7 of the RFIC 250 by a connector component 270J-1 and the conductive trace group 260-7. The sub-array 230SJ2 may be composed of the antennas 230J-4 and 230J-5 both connected to the same antenna port group 250P8 of the RFIC 250 by a connector component 270J-2 and the conductive trace group 260-8. For example the antenna 230J-2 of the antenna array 230 having one-to-one relationship with the corresponding antenna port group 250P6 of the RFIC 250 may be interposed between the antennas 230J-1 and 230J-3 of the same sub-array 230SJ1 along the direction 100. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500I may be implemented in the antenna packages 501 and 502 whenever applicable.

Figure 13:
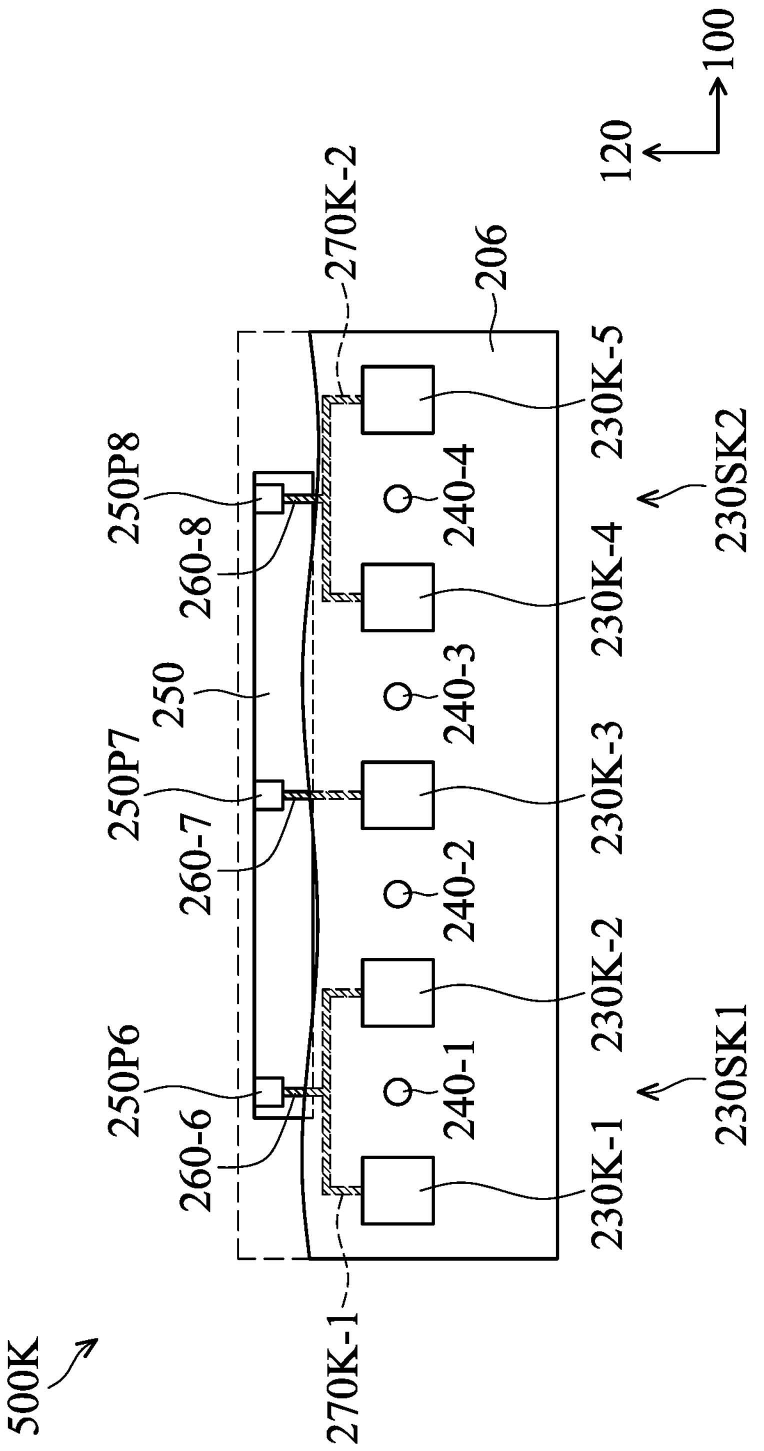

In some embodiments, the antenna module may further include a conductive dummy element disposed on the dielectric substrate and between the antennas of the same antenna array. As shown in FIG. 13, in the antenna module 500K, the antenna array 230 includes antennas 230K-1, 230K-2, 230K-3, 230K-4 and 230K-5 corresponding to the three antenna port groups 250P6 to 250P8 of the RFIC 250. The antenna array 230 includes sub-arrays 230SK1 and 230SK2 arranged in the left and right sides of the one-dimensional antenna array 230. The sub-array 230SK1 may be composed of the antennas 230K-1 and 230K-2 both connected to the same antenna port group 250P6 of the RFIC 250 by a connector component 270K-1 and the conductive trace group 260-6. The sub-array 230SK2 may be composed of the antennas 230K-4 and 230K-5 both connected to the same antenna port group 250P8 of the RFIC 250 by a connector component 270K-2 and the conductive trace group 260-8. In addition, the antenna 230K-3 of the antenna array 230 having one-to-one relationship with the corresponding antenna port group 250P7 of the RFIC 250 may be arranged in the middle of the one-dimensional antenna array 230 and outside the sub-arrays 230SK1 and 230SK2. In some embodiments, the antenna module 500K may further include conductive dummy elements 240-1, 240-2, 240-3 and 240-4 disposed on planar portion 206 of the dielectric substrate 200 and between the antennas 230K-1 to 230K-5 of the same antenna array 230 along the direction 100 (the row direction). More specifically, the conductive dummy element 240-1 is interposed between and separated from the antennas 230K-1 and 230K-2 of the sub-array 230SK1. The conductive dummy element 240-2 is interposed between and separated from the antenna 230K-2 of the sub-array 230SK1 and the antenna 230K-3. The conductive dummy element 240-2 is interposed between and separated from the antenna 230K-3 and the antenna 230K-4 of the sub-array 230SK2. The conductive dummy element 240-4 is interposed between and separated from the antennas 230K-4 and 230K-5 of the sub-array 230SK2. In some embodiments, the conductive dummy elements 240-1 to 240-4 may be positioned at the same level with the antennas 230K-1 to 230K-5. In some embodiments, the antenna module 500K may further include other separated conductive dummy elements (not shown) surrounding the antennas 230K-1 to 230K-5 according the design requirements. It should be noted that the number, size and shape of the conductive dummy elements may be designed according the design rule and not limited to the disclosed embodiment.

In some embodiments, the conductive dummy elements 240-1 to 240-4 may be electrically floating to serve as stress buffers to balance the stress and minimize the warpage of the dielectric substrate 200. In some embodiments, the conductive dummy element may be electrically connected to a control element (not shown) such as a switch or a diode to control the phase and operation frequency of the antennas 230K-1 to 230K-5 of the same antenna array 230. It should be appreciated that although some features are shown in some embodiments but not in other embodiments, these features may (or may not) exist in other embodiments whenever possible. For example, although each of the illustrated exemplary embodiments shows specific arrangements of the sub-arrays of the antenna array 230, any other combinations of arrangements of the sub-arrays of the antenna array 230 may also be used whenever applicable. In addition, other combinations of the sub-arrays of the antenna array 230 of the antenna modules 500A to 500J may be implemented in the antenna packages 501 and 502 whenever applicable.

Embodiments provide an antenna module. The antenna module includes a dielectric substrate, a radio frequency integrated circuit (RFIC) and a one-dimensional antenna array composed of at least two antennas. The RFIC and the antenna array are arranged on the opposite surfaces of the dielectric substrate. In addition, at least one of the antenna arrays may include a sub-array composed of at least two adjacent or non-adjacent antennas. The antennas of the same sub-array are all connected to the same antenna port group of the RFIC. Therefore, the antenna module may be composed of a 1×5 array and a 1×n array, wherein n is integer equal to or greater than five even the RFIC having the limited number of antenna port groups. The EIRP and gain of the antenna module including the sub-array may be improved.

In some embodiments, the antennas of the same sub-array have different antenna types from each other. The antenna array may have any number of the antennas corresponding to the limited antenna port group of the RFIC. The sub-array of the antenna array may be composed of any number of the antennas. The sub-array may be arranged on any position of the antenna array. The antennas of the same sub-array may be arranged in different orientations. Therefore, the antennas operated in high and low frequency bands may be arranged in the same row. The antennas of the different sub-arrays may be operated in different frequency bands including a low frequency band, a medium frequency band, a high frequency band or an ultra-high frequency band. A first space between the adjacent antennas of the same sub-array may be different from a second space between the antenna outside the sub-array and the adjacent antenna of the sub-array. The first space and second space may be individually optimized by the geometry of the planar portion of the dielectric substrate or the gain of the antennas. The antennas of the same sub-array are arranged in a staggered manner along the row direction to increase design flexibility. The antennas of the same sub-array are positioned at different levels. The sub-array may be composed of the non-adjacent antennas. The antenna module may further include a conductive dummy element disposed on the dielectric substrate and between the antennas of the same antenna array. The conductive dummy elements may be electrically floating to serve as stress buffers to balance the stress and minimize the warpage of the dielectric substrate. The conductive dummy element may be electrically connected to a control element (not shown) such as a switch or a diode to control the phase and operation frequency of the antennas of the same antenna array.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna module, comprising:

a dielectric substrate;

a radio frequency integrated circuit (RFIC) disposed on the dielectric substrate, wherein the RFIC comprises a first antenna port group and second antenna port groups to receive or transmit signals;

a first number of first antennas arranged in a first row on the dielectric substrate, wherein all of the first antennas are connected to the first antenna port group of the RFIC; and a second number of second antennas arranged with the first antennas in the first row, wherein all of the second antennas are connected to a third antenna port group of the RFIC.

2. The antenna module as claimed in claim 1, further comprising:

a third number of third antennas arranged in a second row on the dielectric substrate, wherein the third antennas are individually connected to the different second antenna port groups of the RFIC.

3. The antenna module as claimed in claim 2, wherein the dielectric substrate comprises:

a first planar portion and a second planar portion, wherein the first planar portion and the second planar portion are facing different directions; and a bent portion connected between the first planar portion and the second planar portion, wherein the first antennas are disposed on the first planar portion, and the third antennas are disposed on the second planar portion.

4. The antenna module as claimed in claim 1, wherein the first antennas are connected to each other by a connector component, wherein the connector component is connected to the first antenna port group of the RFIC by a single first conductive trace group.

5. The antenna module as claimed in claim 1, wherein the RFIC comprises a fourth number of antenna port groups composed of the first antenna port group and the second antenna port groups, and wherein the fourth number is less than a total of the first number, the second number and the third number.

6. The antenna module as claimed in claim 1, wherein the second antennas are arranged outside the first antennas.

7. The antenna module as claimed in claim 6, wherein a first space between the adjacent first antennas is different from a second space between the second antenna and the first antenna adjacent to the second antenna.

8. The antenna module as claimed in claim 1, wherein the second antennas are interposed between the first antennas.

9. The antenna module as claimed in claim 1, wherein the first antennas are operated in a first frequency band and the second antennas are operated in a third frequency band that is different from the first frequency band.

10. The antenna module as claimed in claim 1, wherein the first antennas have different dimensions along a row direction.

11. The antenna module as claimed in claim 1, wherein adjacent sides of the first antennas are not parallel with each other.

12. The antenna module as claimed in claim 1, wherein the first antennas are arranged in a staggered manner along a row direction.

13. The antenna module as claimed in claim 1, wherein the first antennas are positioned at different levels.

14. The antenna module as claimed in claim 1, further comprising:

a conductive dummy element disposed on the dielectric substrate and between the second antennas.

15. The antenna module as claimed in claim 14, wherein the conductive dummy element is electrically floating.

16. The antenna module as claimed in claim 14, wherein the conductive dummy element is electrically connected to a control element.

17. An antenna module, comprising:

a dielectric substrate;

a radio frequency integrated circuit (RFIC) disposed on the dielectric substrate, wherein the RFIC comprises a single first antenna port group and second antenna port groups to receive or transmit signals; and antennas arranged in a row on the dielectric substrate and opposite the RFIC, wherein a first portion of the antennas are all connected to the first antenna port group of the RFIC by a single first conductive trace group, and wherein a second portion of the antennas are individually connected to the different second antenna port groups of the RFIC by second conductive trace groups.

18. An antenna module, comprising:

a dielectric substrate, comprising:

a first planar portion and a second planar portion, wherein the first planar portion and the second planar portion are facing different directions; and a bent portion connected between the first planar portion and the second planar portion;

a radio frequency integrated circuit (RFIC) disposed on the dielectric substrate, wherein the RFIC comprises a single first antenna port group and second antenna port groups to receive or transmit signals;

a first antenna array comprising first antennas arranged in a first row on the first planar portion and connected to the first antenna port group and the second antenna port groups, wherein the first antenna array comprises a sub-array composed of at least two of the first antennas connected to the first antenna port group of the RFIC; and a second antenna array comprising second antennas arranged in a second row on the second planar portion.

19. The antenna module as claimed in claim 18, wherein the second antennas are individually connected to the different second antenna port groups of the RFIC.

* * * * *